Figure 1:
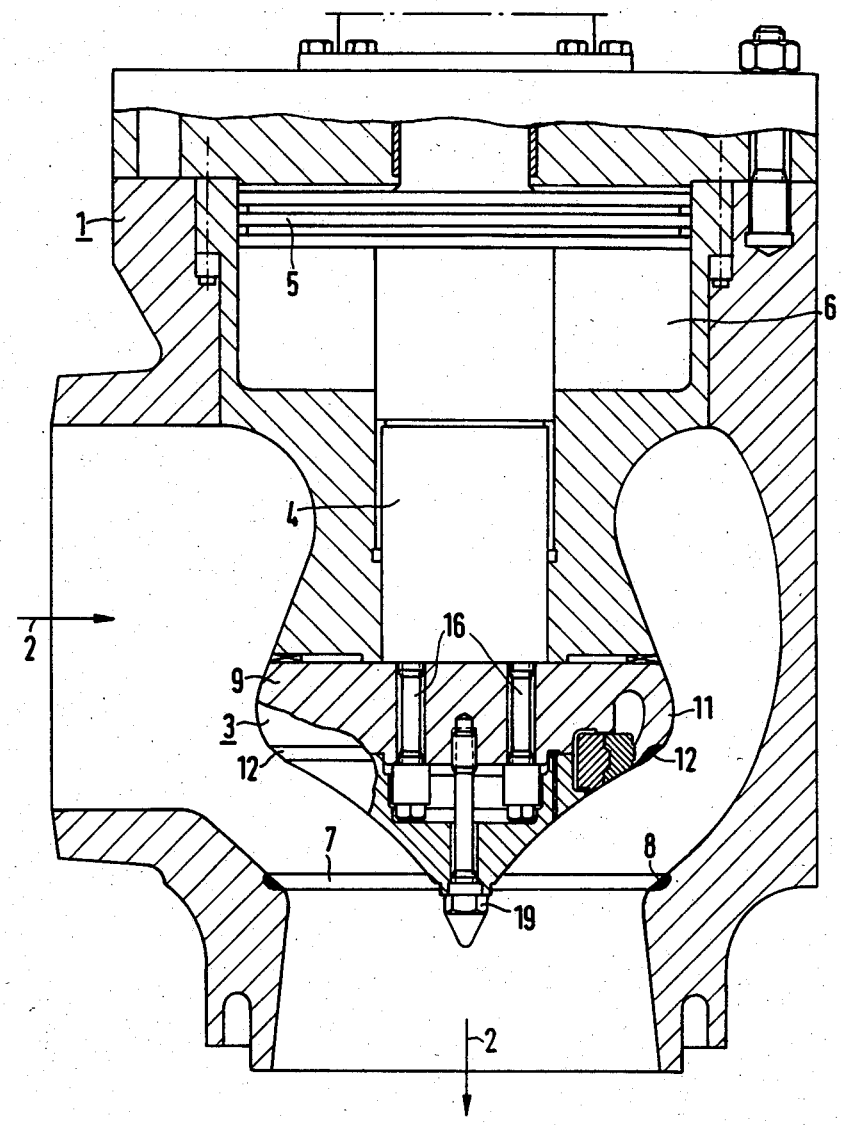

United States Patent [19]

Schabert et al.

[11] Patent Number: 4,607,822
[45] Date of Patent: Aug. 26, 1986

[54] SHUTOFF VALVE WITH A CONICAL VALVE SEAT

[75] Inventors: Hans-Peter Schabert, Erlangen; Max Heller, Uttenreuth; Erwin Laurer, Möhrendorf; Hans Leinweber, Schwabach, all of Fed. Rep. of Germany

[73] Assignee: Kraftwerk Union Aktiengesellschaft, Mülheim, Fed. Rep. of Germany

[21] Appl. No.: 607,687

[22] Filed: May 7, 1984

[30] Foreign Application Priority Data

May 9, 1983 [DE] Fed. Rep. of Germany ...... 3316895

[51] Int. Cl.⁴ ............................ F16K 1/12; F16K 1/46
[52] U.S. Cl. .................................... 251/334; 251/357; 251/118; 251/122
[58] Field of Search ................ 251/334, 357, 122, 118

[56] References Cited

U.S. PATENT DOCUMENTS 1,449,876  3/1923  Williams ..................... 251/334 X
2,192,339  3/1940  Wilson .

FOREIGN PATENT DOCUMENTS 1675575  12/1970  Fed. Rep. of Germany ...... 251/334
157733   12/1932  Switzerland .
237464   8/1945   Switzerland .

Primary Examiner—Arnold Rosenthal
Attorney, Agent, or Firm—Herbert L. Lerner; Laurence A. Greenberg

[57] ABSTRACT

A shutoff valve, includes a conical valve seat, and a valve disc movable toward the valve seat in a given direction, the valve disc including a base body covering the valve seat, an annular projection projecting from the base body in the given direction, and a rim formed on the outside of the projection resting against the valve seat in a closed position of the valve, the projection having a region with a given wall thickness in vicinity of the base body and the projection having a free end reinforced to at least 1.5 times the given thickness in the radial direction.

3 Claims, 3 Drawing Figures

SHUTOFF VALVE WITH A CONICAL VALVE SEAT

The invention relates to a shutoff valve with a conical valve seat and a valve disc having a rim which rests against the valve seat, the rim being the outside of an annular projection which projects from a base body covering the valve seat in the direction of the motion of the valve disc.

A valve of the above-mentioned type, is known from U.S. Pat. No. 2,192,339. The projection according to FIG. 2 of that device is a ring having a constant wall thickness which is screwed into the base body. The wall thickness is chosen to be so small that the projection can readily adapt itself to shape deviations of the sealing seat of the housing for the purpose of sealing with a low axial positioning force. This is done until it rests against a support body which has a wall thickness that is many times larger after a further increase of the positioning force.

It is accordingly an object of the invention to provide a shutoff valve with a conical valve seat which overcomes the hereinaforementioned disadvantages of the heretofore-known devices of this general type, and which remains tight even in the case of a deformation of the housing, in such a manner that it can be produced more easily and its operation becomes insensitive to corrosion product deposits in the ring gap. In the conventional construction, a large positioning force can lead to a local crushing of the weak sealing edge of the projection where corrosion products or a foreign body may have settled in the ring gap. This crushing would then lead to leaks if the sealing power is low. Such a relaxation of the sealing power occurs, for instance, of necessity in valves operated by the medium itself, for instance in main-steam shutoff valves in nuclear power plants. However, these valves must remain tight even with a fraction of the full steam pressure.

With the foregoing and other objects in view there is provided, in accordance with the invention, a shutoff valve, comprising a conical valve seat, and a valve disc movable toward the valve seat in a given direction, the valve disc including a base body covering the valve seat, an annular projection projecting from the base body in the given direction, and a rim formed on the outside of the projection resting against the valve seat in a closed position of the valve, the projection having a region with a given wall thickness in vicinity of the base body and the projection having a free end reinforced to at least 1.5 times the given thickness in the radial direction.

According to the invention, a separate support body can be dispensed with and therefore the gaps between the support body and the projection can also be dispensed with. The desired sealing force results from the reinforcement of the projection at its free end. As a result, the radial forces produced in the conical sealing seat by the axial positioning force are taken up to a predictable degree by circumferential compression stresses in the reinforcement acting as a ring. This ring only develops a small bending resistance if the valve seat develops an oval shape, so that the desired adaption of the sealing rim of the valve disc to the deformed valve seat in the housing, is nevertheless possible.

The axial forces to be supplied for sealing, i.e. forces in the direction of the motion of the valve disc, pass through an elastic cylinder or conical region between the reinforced rim and the base body of the valve disc. However, these forces generate purely longitudinal stresses, so that primary bending stresses do not occur in the process. For this reason, the intermediate region can also be made with thin walls, so that in the case of radial deflection of the rim acting as the sealing surface in line with an oval distortion, only secondary bending stresses or permissible magnitude are produced between the connecting point of the projection and the base body of the valve disc.

The invention should not be confused with a valve which is known from Swiss Pat. CH-PS No. 237,464, which has a bell-shaped valve disc, in which the rim of the bell body is reinforced. This is because the valve disc is to rest against a cylindrical valve seat in the closed position, while sealing in the radial direction and should even be ground clean and lapped if necessary for this purpose. However, such a structure is very sensitive and for this reason it is poorly suited for practical operation, such as for shutting off a main steam line.

In accordance with another feature of the invention, the unreinforced region of the projection in vicinity of the base body is cylindrical or conical.

In accordance with a further feature of the invention, the projection is deformable over a given distance in the radial direction, the base body includes a conical portion protruding from the projection in the given direction and forming an aerodynamic contour with the projection, and the conical portion is spaced apart from the projection by a distance or gap being greater than the given distance. Such a projecting cone is shown, for instance, in FIG. 1 of Swiss Pat. CH-PS No. 157,733. However, the cone shown in that device is for a valve body with a sealing ring which is mounted in the axial direction, and in which totally different conditions prevail with respect to the sealing.

In accordance with an added feature of the invention, the reinforced free end of the projection is subdivided at least one in radial direction forming an onion skin shape.

In accordance with an additional feature of the invention, the free end of the projection is subdivided into rings having a larger cross section in the axial direction than in the radial direction. Each ring provides the desired reinforcement of the projection in the radial direction without a substantial increase of the bending resistance against ovalization. This is because the bending resistance of a ring-shaped cross-sectional area is determined by the polar moment of inertia $bh^3/12$. If the ring is subdivided radially, i.e. if it is replaced by two concentric rings of half the height, then each of the new rings has only $\frac{1}{8}$ of the original bending moment left. Both together therefore have $\frac{1}{4}$ of the original bending resistance. On the other hand, the capacity for taking up circumferential stresses is fully preserved. This applies in particular to the case in which the cross section of the ring is larger in the axial direction than in the radial direction.

The projection and the ring rest against each other without play. They can be connected together in different ways in order to secure them against undesired displacement. In accordance with again another feature of the invention, the projection and the rings have slots and keys formed therein engaging each other in the radial direction. The assembly can be made while using different temperatures for the parts, as in a shrink connection.

In accordance with again a further feature of the invention, the conical portion has a shoulder formed thereon for holding the rings in place.

In contrast to the valve according to U.S. Pat. No. 2,192,339 mentioned above, in accordance with a concomitant feature of the invention, the region of the projection has a slightly forwardly inwardly or outwardly curved cross section, and the height of the chord of the curvature of the cross section in the longitudinal section is less than one-quarter of the length of the chord. Outward curvature is recommended if an outside pressure acts on the projection simultaneously with the axial positioning force and if the positioning force rises and falls jointly with this external pressure. This is the case with valves which are operated by the medium itself. In this case, the curvature can be optimized numerically so that the projection requires a particularly small minimum wall thickness for a predetermined permissible diaphragm stress in its material. This again permits a particularly easy adaptation of the projection to an ovalized housing, so that tightness is assured even with a particularly low stream pressure or positioning force.

Other features which are considered as characteristic for the invention are set forth in the appended claims.

Although the invention is illustrated and described herein as embodied in a shutoff valve with a conical valve seat, it is nevertheless not intended to be limited to the details shown, since various modifications and structural changes may be made therein without departing from the spitir of the invention and within the scope and range of equivalents of the claims.

Figure 2:
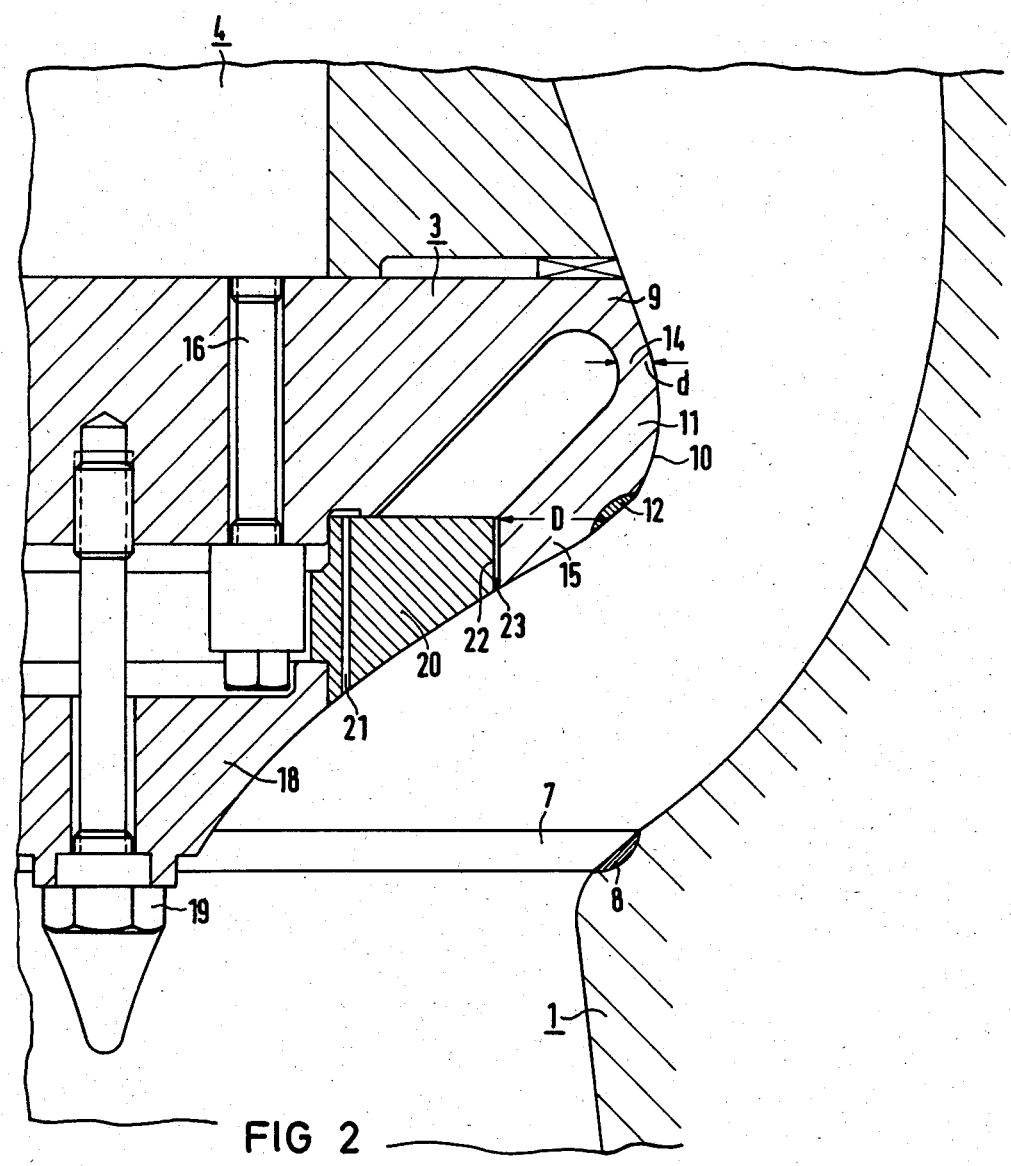
Figure 3:
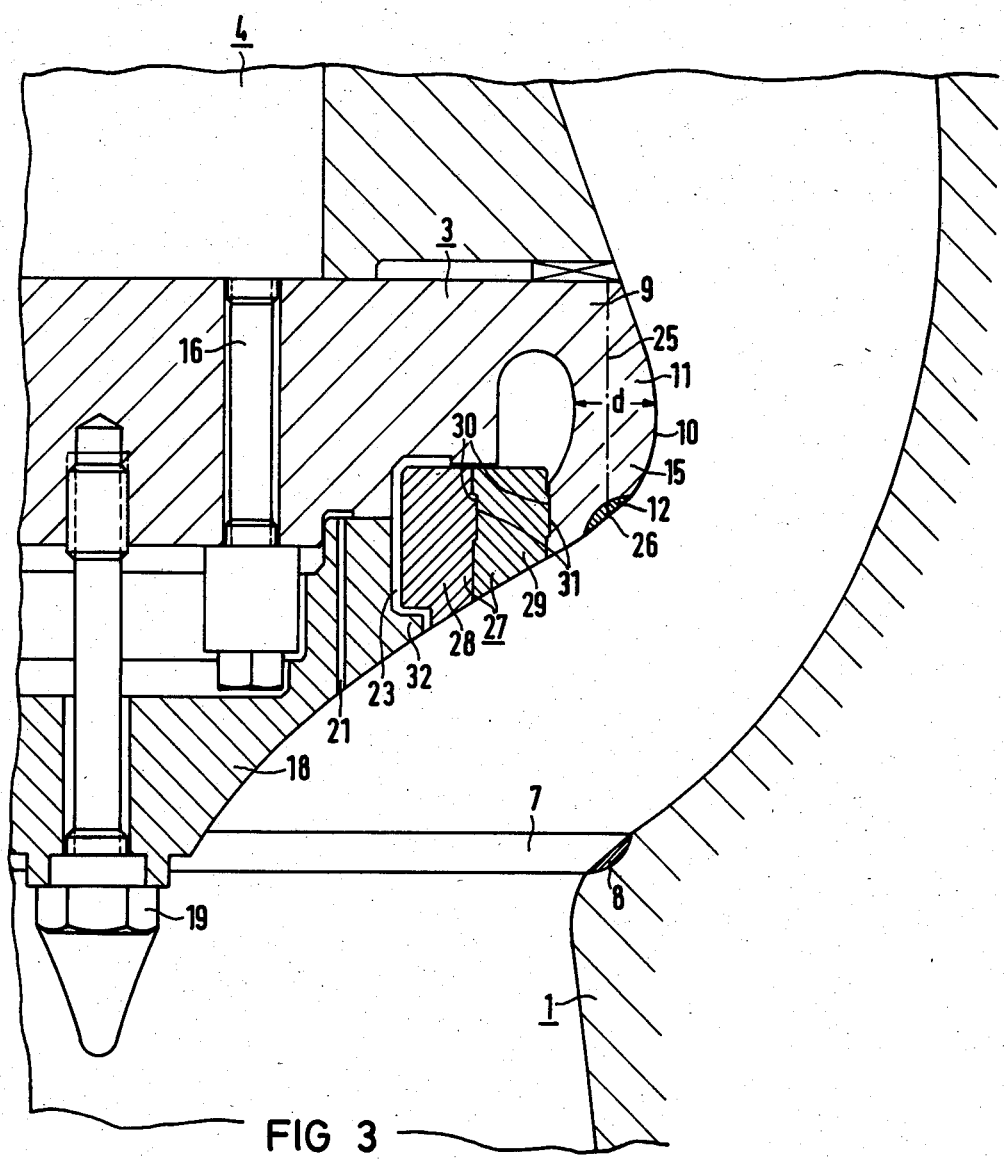

The construction and method of operation of the invention, however, together with additional objects and advantages thereof will be best understood from the following description of specific embodiments when read in connection with the accompanying drawings, in which:

FIG. 1 is a fragmentary, diagrammatic, vertical-sectional view of the overall structure of a shutoff valve for main steam lines in nuclear power stations; and FIGS. 2 and 3 are views of parts of the device of FIG. 1 showing details of two embodiments of the valve disc on an enlarged scale.

Referring now to the figures of the drawing in detail and first particularly to FIG. 1 thereof, there is seen a housing 1 of a valve through which medium flows in the direction of arrows 2. The housing has a nominal clearance of 700 mm. Part of this clearance is a passage cross section of 630 mm in vicinity of a movable valve disc 3, through which main steam is to flow with a pressure of 65 bar and a temperature of 280° C., at a rate of 500 kg/s with a minimum of loss.

The valve disc 3 is shown in FIG. 1 in the open position. In this position, the valve disc is held by a piston 5 through a valve plunger 4. The piston 5 is actuated by main steam in a cylinder 6 The position of the valve disc 3 can be determined by a position indicating device.

In the closed position, the valve disc 3 rests on a valve seat 7 which is defined by the inner contour of the valve housing 1. At the valve seat 7, the housing 1 is shielded by a ring 8 of stellite made by build-up welding or hardfacing. The valve seat 7 is constructed as a planar conical surface by machining. The valve disc 3 pushes on the conical surface with a predetermined closing force.

The valve disc 3 is aerodynamically shaped and includes a base body 9 which is fastened to the plunger 4 by means of screws 16. The base body 9 carries a projection 11 at the outside thereof, which forms a matching contour that is associated with the valve seat 7 and rests against the valve seat 7 in the closed position. A corresponding planar conical region is made in the projection 11, by machining a stellite ring 12.

FIG. 2 clearly shows that the stellite ring 12 belongs to a rim 10 on the outside of the projection 11 which extends from the base body 9 in the direction of the motion of the valve. The thinnest region 14 of the projection 11 has a wall thickness d of 20 mm and the free end 15 of the projection 11 is reinforced with a wall thickness D of 60 mm, as measured in the radial direction, i.e. 3-times the value.

In order to reduce the flow resistance, a conical tip 18 is fastened to the base body 9 by means of a screw 19 which protrudes from the projection 11. The tip 18 covers the screws 16 which are used for fastening the base body 9. The screw 19 also holds a ring 20 which likewise contributes to the aerodynamic construction of the valve disc 3. The ring 20 has drainage holes 21 formed therein. A gap 23 is provided between an other rim 22 of the ring 20 and the reinforced free end 15, so that the projection 11 can adapt itself with little resistance to the shape of the valve seat 7 when the valve is being closed. This is due to the fact that the gap 23 is larger than the largest radial excursion of the projection 11.

In the embodiment according to FIG. 3, the valve disc 3 is provided with an outwardly-curved projection 11. The statically effective center line of the projection 11 is indicated by the dot-dash line 25. The center line 25 runs through conical mating surfaces 26 of the stellite cladding or shielding 12 in the rim of the projection 11, which face the valve seat 7. The smallest wall thickness d at that location is again 20 mm.

On the other hand, the reinforcement 15 has a radial thickness which is several times larger, specifically due to a support ring 27 formed of two interleaved parts 28 and 29. The parts 28 and 29 are held to each other and to the reinforcement 15 by identical keys 30 and corresponding slots 31 which are engaged in the radial direction. This achieves a considerable reinforcement against the radial force occuring due to the sealing pressure, without any substantial increase of the bending resistance against ovalizing motions for adaptation to the valve seat. A projecting shoulder 32 of the cone 18 ensures that the ring 27 will not drop out.

The foregoing is a description corresponding in substance to German Application No. P 33 16 895.4, filed May 9, 1983, the International priority of which is being claimed for the instant application and which is hereby made part of this application. Any material discrepancies between the foregoing specification and the aforementioned corresponding German application are to be resolved in favor of the latter.

We claim:

1. Shutoff valve, comprising a conical valve seat, and a valve disc movable toward said valve seat in a given direction, said valve disc including a base body covering said valve seat, an annular projection projecting from said base body in said given direction, and a rim formed on the outside of said projection resting against said valve seat in a closed position of the valve, said projection having a region with a given wall thickness in vicinity of said base body, said projection having a free end and said free end of said projection being subdivided at least once in radial direction into rings having a larger cross section in the axial direction than in the radial direction, said rings being unsupported by said base body in radial direction, said rings reinforcing said free end of said projection to at least 1.5 times said given thickness in the radial direction and said rings having a deformation resistance against ovalizing being small enough to absorb substantially all radial forces acting on said valve seat.

2. Shutoff valve according to claim 1, wherein said projection and said rings have slots and keys formed thereon connecting each other together.

3. Shutoff valve, comprising a conical valve seat, and a valve disc movable toward said valve seat in a given direction, said valve disc including a base body covering said valve seat, an annular projection projecting from said base body in said given direction, and a rim formed on the outside of said projection resting against said valve seat in a closed position of the valve, said projection having a region with a given wall thickness in vicinity of said base body, said projection having a free end and said projection having a ring being unsupported by said base body in radial direction, said ring reinforcing said free end of said projection to at least 1.5 times said given thickness in the radial direction and said ring having a deformation resistance against ovalizing being small enough to absorb substantially all radial forces acting on said valve seat, said projection being deformable over a given maximum distance in the radial direction, said base body including a conical portion protruding from said projection in said given direction and forming an aerodynamic contour with said projection, and said conical portion being spaced apart from said projection by a distance being greater than said given maximum distance.

* * * * *